United States Patent Office 3,844,986
Patented Oct. 29, 1974

3,844,986
SULFOALKYL ACRYLATE-OLEFIN COPOLYMER CATION EXCHANGERS
Toshiharu Tomatu, Otake, Tadao Iwata, Iwakuni, and Hidesaburo Oi, Waki, Yamaguchi-ken, Japan, assignors to Mitsui Petrochemical Industries, Ltd., Tokyo, Japan
No Drawing. Filed July 11, 1973, Ser. No. 378,165
Claims priority, application Japan, July 14, 1972, 47/69,933
Int. Cl. C08f 15/02
U.S. Cl. 260—2.2 R
3 Claims

ABSTRACT OF THE DISCLOSURE

A cation-exchangeable structure which consists of a water-insoluble random copolymer having (A) olefin units of formula (1)

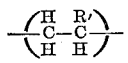 (1)

and (B) units of formula (2)

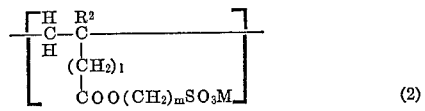 (2)

the amount of the units of formula (2) being 0.1 to 5 milliequivalents per gram of the random copolymer.

---

This invention relates to a cation-exchangeable structure composed of a water-insoluble random copolymer which in spite of the uncrosslinked state, has sufficient thermal and mechanical properties suitable for use as an ion-exchangeable structure, for example, an ion-exchangeable filamentary structure or membrane, and can be melt-shaped easily into such a structure. This cation-exchangeable structure possesses excellent mechanical strength, cation exchange capacity, and exchange rate, and can be readily regenerated.

More specifically, this invention relates to a cation-exchangeable structure which consists of a water-insoluble random copolymer having (A) olefin units of formula (1)

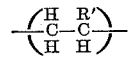 (1)

wherein R' is a member selected from the group consisting of a hydrogen atom and alkyl radicals containing 1 to 4 carbon atoms, and (B) units of formula (2)

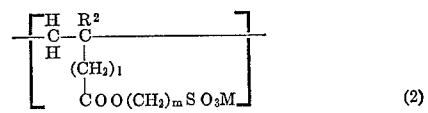 (2)

wherein $R^2$ is a member selected from the group consisting of a hydrogen atom and a methyl radical, $l$ is 0 or an integer of 5 to 8, $m$ is 3 or 4, and M is a member selected from the group consisting of a hydrogen atom and alkali metals, the amount of the units of formula (2) being 0.1 to 5 milliequivalents per gram of said random copolymer.

Ion-exchange membranes have gained increasing importance in recent years with regard to desalination of the sea water and other salt-containing liquids and the production of fuel cells. The most ideal method of producing ion-exchange membranes or ion-exchange fibers consists in preparing a melt or solution of an ion-exchange resin, and then fabricating it. However, the conventional ion-exchange resins of the styrene type are generally cross-linked to a high degree, and it is impossible to melt them. Furthermore, since they are insoluble in any solvent, it is impossible to shape from their solutions.

In view of this situation, the conventional ion-exchange membranes have been produced, for example, by (a) a method wherein an insoluble infusible ion-exchange resin powder is dispersed in a polymer having film forming ability, and such polymer is formed into films, (b) a method wherein a monomer having an ion-exchange group is condensed or polymerized with a cross-linking agent, and simultaneously a film is formed, or (c) a method wherein anion-exchange group is introduced by chemical treatment into a film of a polymer free from an ion-exchange group. Method (a) permits simple production, but it is extremely difficult to disperse the ion-exchange resin powder uniformly over a wide area, and the resulting membrane has small electric conductivity. According to method (b), film formation must be performed at the same time as polymerization, and a great expert skill is required in this regard. Furthermore, the resulting film is generally brittle, and meticulous care must be exercised in using it. The technology in regard to method (c) has recently showed a great advance, and ion-exchange membranes of relatively good performance can be produced by using this method. However, it is extremely difficult to introduce an ion-exchange group uniformly into the entire surface of a large-sized film, and the production of a base film and the introduction of ion-exchange groups must be performed under controlled mild conditions, requiring complicated and careful reaction operations.

British Pat. 1,218,712, discloses a method of producing an ion-exchange membrane by reacting a copolymer of ethylene and vinyl alcohol with a sultone such as propane sultone and forming a solution of the resulting modified copolymer into a membrane. This modified copolymer has a side chain of the sulfoalkyl ether type, and is quite different in skeleton from the material of this invention having an ester-type side chain. Accordingly, this modified copolymer has poor thermal stability at the time of fabrication, and cannot be melt shaped. Thus, the fabrication of this copolymer must rely on a casting method using its solution, which requires complicated and careful control. If modified copolymers of the sulfoalkyl ether type are melt shaped by a customary method, thermal decomposition of the copolymers occurs. For this reason, the content of sulfonic acid groups decreases, and the resulting ion-exchange membrane has reduced performance. In contrast, with the ester-type modified copolymer used in this invention, such a phenomenon is not observed.

French Pat. 1,203,683 discloses an interpolymer which includes a copolymer having the unit of formula (2) in the copolymer used in the present invention. However, this French patent fails to disclose alpha-olefins which constitute units (1), which is another component of the copolymer used in this invention. A specific example given is styrene. The copolymer obtained by the method of the French patent has feasible thermal stability, but cannot be melt shaped into films or other articles. For fabrication, the casting method must be used. Moreover, the mechanical strength of the films is extremely small, and poses a problem in practical applications.

It has now been found that the defects of an ion-exchanger composed of a sulfone-modified copolymer can be remedied by a cation-exchangeable structure made up of a water-insoluble random copolymer having the units (1) and (2) described above.

Accordingly, an object of this invention is to provide a cation-exchangeable structure which can be obtained by melt-shaping techniques, has excellent cation exchange capacity and exchange speed as well as feasible thermal and mechanical properties, and which can be easily regenerated.

Many other objects of this invention along with its advantages will become apparent from the following description.

The cation-exchangeable structure of this invention is formed from a water-insoluble random copolymer composed of the olefin units (1) and the units (2) described above. Graft copolymers or block copolymers could be produced from these units, but these copolymers are difficult to melt-shape into films and other articles and the resulting films have extremely low mechanical strength.

Specific examples of the alpha-olefin that provides unit (1) are ethylene, propylene, 1-butene, 4-methyl-1-pentane, that is to say, alpha-olefins of the unit of formula (1) in which R' is hydrogen, methyl, ethyl and iso-butyl.

Specific examples of the compound that provides unit (2) are sulfopropyl esters or sulfobutyl esters of a member selected from acrylic acid, methacrylic acid and omega-ethylenically unsaturated aliphatic carboxylic acids or the alkali metal salts of these, for example, sodium and potassium salts.

Specific examples of the omega-ethylenically unsaturated aliphatic carboxylic acids are

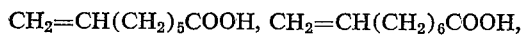

and

The amount of the unit of formula (2) is 0.1 to 5 milliequivalents, preferably 0.5 to 3 milliequivalents, per gram of the water-insoluble random copolymer. If the amount of unit of formula (2) is in excess of the above range, the melt-shapability of the resulting copolymer is poor, and the swellability of the resulting cation-exchangeable structure towards water increases to reduce the performance of the structure as an ion-exchange membrane or reduce the mechanical strength of the film drastically. Furthermore, when the amount of the unit of formula (2) is excessively small, the ion-exchange capacity is too small, and the resulting structure loses practical utility.

The water-insoluble random copolymer which constitutes the cation-exchangeable structure of this invention can be obtained by copolymerizing an alpha-olefin having 1 to 6 carbon atoms with a sulfopropyl ester, sulfobutyl ester or an alkali metal salt of a member selected from the group consisting of acrylic acid, methacrylic acid and omega-ethylenically unsaturated aliphatic carboxylic acids having 8 to 11 carbon atoms, in the presence of a catalyst. Or the alpha-olefin is copolymerized with the unsaturated carboxylic acid in the presence of a catalyst, and then the copolymer is reacted with propanesultone and/or butanesultone. The above copolymerization reaction can be carried out at room temperature to 300° C. and atmospheric pressure to 400 kg./cm.$^2$ in the presence of a radical catalyst and a Ziegler-type catalyst.

When —$SO_3M$ of the resulting water-insoluble random copolymer is —$SO_3H$, the copolymer may be treated by a known method, that is by treating with a solution of an alkali such as sodium hydroxide or potassium hydroxide, thereby to convert the —$SO_3H$ to its alkali salt. Conversely, when the —$SO_3M$ of the copolymer is an alkali metal salt, it may be treated with a solution of a mineral acid such as hydrochloric acid to convert it to —$SO_3H$. This treatment may be carried out before or after the formation of ion-exchange membranes or fibers. For preparing the modified olefin copolymer, the latter method is preferably used.

The water-insoluble random copolymer used in this invention includes, for example, a terpolymer of ethylene, methacrylic acid and a sulfopropyl ester or sodium salt of methacrylic acid. For example, when the random copolymer used in this invention is prepared by reacting a copolymer of ethylene and methacrylic acid with propane sultone, it is not necessary to sulfopropylate all of the methacrylic acid unit, but the methacrylic acid unit may remain there unreacted, in which case desirable results are often obtained.

When the random copolymer of this invention is to be prepared by direct copolymerization of an olefin with a sulfoalkyl ester of an unsaturated carboxylic acid, a minor amount of another monomer may be used.

Examples of the other monomer are acrylic acid esters, methacrylic acid esters, undecylenic acid esters, and styrene, which are used in an amount of not more than 5 mol percent based on the olefin.

Preferred examples of the water-insoluble random copolymer that constitutes the cation-exchangable structure of this invention are:

(1) A water-insoluble random copolymer having (A)' ethylene units of the formula (1)'

and (B)' units of the following formula (2)'

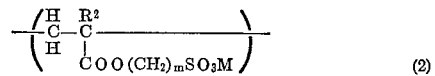

wherein $R^2$, $m$ and M are the same as defined in formula (2).

In this random copolymer, the amount of the unit of formula (2)' is 0.1 to 5 milliequivalents per gram of the random copolymer.

(2) A water-insoluble random copolymer having (A)" olefin units of the following formula (1)"

wherein R' is a member selected from the group consisting of hydrogen, methyl, ethyl and isobutyl, and (B)" units of the following formula (2)"

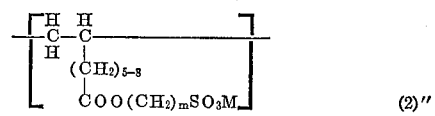

wherein $m$ and M are the same as defined above in formula (2).

In this random copolymer, the amount of the unit of formula (2)" in 0.1 to 5 milliequivalents per gram of the random copolymer.

The water-insoluble random copolymer used in this invention can have a wide range of molecular weight, usually 5,000 to 1 million. The random copolymer has a melt index (ASTM D–1238–70) of about 0.1 to 100, and a Vicat softening point (ASTM D–1525–70) of 60 to 250° C.

Since the water-insoluble random copolymer in this invention is not cross-linked, it is thermoplastic. Furthermore, since the random copolymer also contains a sulfonic acid group or its salt through an ester bond, it has extremely good thermal stability. The polymer can be shaped into ion-exchange membranes or ion-exchange fibers by any known shaping method such as melt-extrusion or compression molding. The preferred molding temperature is 200 to 350° C., and at this time, an additive such as an anti-oxidant, ultraviolet ray absorbent, alipping agent or copper damage preventing agent, or an ordinary pigment may be added to the copolymer with good dispersibility. These additives can be blended by customary methods, for example by using various blenders, blenders, kneaders or rolls. Furthermore, because the random copolymer used in this invention can be dissolved in a mixture of two solvents having different polarities, it can be shaped from its solution into a film or fibrous form. For example, a mixed solvent of decalin and dimethyl sulfoxide, and a mixed solvent of tetralin and a hexaalkyl phosphotriamide can be used. It is especially recommended that fibers of large surface areas be produced by discharging a hot solution of the copolymer in such a solvent from a nozzle. If required, a net of a vinylidene chloride resin, for example, may be used to form a reinforced ion-exchange membrane.

The membrane obtained in accordance with this invention is generally soft and transparent and can be stored in the dry state without deterioration of its mechanical properties.

The following Examples and Comparative Examples illustrate the production of the cation-exchangable structure of this invention and the properties of the resulting structure. The properties were measured in accordance with the following methods.

(1) EXCHANGE CAPACITY

The sample is dipped in 1 N aqueous solution of hydrochloric acid for one day. The R-H type membrane obtained was washed several times with pure water, and then dipped for one day in a 1 N aqueous solution of sodium chloride. The acid in the solution which is liberated by the exchange is quantitatively determined using an aqueous solution of potassium hydroxide of a known concentration, and the exchange capacity is determined.

(2) WATER CONTENT

Water on the surface of the R-Na type membrane sufficiently equilibrated in a 1 N aqueous solution of sodium chloride is wiped off, and the membrane is dried at 45° C. at reduced pressure, and the water content is measured.

(3) ELECTRIC RESISTANCE

This is the product obtained by multiplying the electric resistance in the perpendicular direction of the membrane as measured in a 1 N NaCl aqueous solution, by the area of the membrane. It is called an area resistance. (The dimension is ohms cm.$^2$.)

(4) TRANSPORT NUMBER

A 0.5 N aqueous sodium chloride solution is partitioned from a 2.5 N aqueous sodium chloride solution by a membrane saturated with a 1.5 N sodium chloride aqueous solution, and the electromotive force (E) at this time is calculated.

Example 1

100 g. of an ethylene/acrylic acid copolymer (90 mol percent ethylene units and 10 mol percent acrylic acid units, melt index 10 g./10 min.) was dissolved by heating in one liter of paraxylene, and 155 ml. of a 2 N ethanolic sodium hydroxide solution was added with stirring over the course of one hour, after which the mixture was heated under reflux for one hour.

After cooling, the product was thoroughly washed with methanol, and dried at reduced pressure, whereupon all carboxylic acid groups contained in the copolymer were converted to sodium salts. 100 g. of the copolymer (completely neutralized) and 37 g. of 1,3-propane sultone were placed in 1 liter of paraxylene and allowed to react at 130° C. for 1 hour. After cooling, the reaction product was thoroughly washed with acetone and dried at reduced pressure to afford 160 g. of a white powdery sulfopropylated ethylene copolymer having a melt index of 0.5 g./10 min. and a Vicat softening point of 71° C.

The copolymer was extracted with boiling methanol for 24 hours, and subjected to elemental analysis. It was found that 1.76 m-mols of sulfur was contained per gram of the sulfopropylated ethylene copolymer. An atomic absorption analysis showed that 1.75 m-mols of sodium was contained per gram of the copolymer.

The modified ethylene copolymer was compression molded at 240° C. into a 0.1 mm. thick film, and the properties of it as a cation-exchange membrane were examined. The results are shown in Table 1.

Comparative Example 1

By the method disclosed in British Pat. 1,218,712, spiro-bi-2:2'-propane-sultone and propane sultone were reacted with a vinyl alcohol/ethylene copolymer to form a modified ethylene copolymer containing 1.41 m-mols of a sulfonic acid group per gram of the dried product. The resulting modified ethylene copolymer was compressed at 180° C. to form a 0.3 mm. thick film, and its properties as a cation-exchange membrane were determined. The results obtained are shown in Table 1.

Comparative Example 2

By the method disclosed in French Pat. 1,203,683, styrene, 3-sulfo-1-propyl acrylate (Na salt), and benzoyl peroxide were polymerized to form a polymer containing 1.52 m-mols of a sulfonic acid group per gram of the dried product. Films could not be produced by compression molding of this polymer at elevated temperatures of 150 to 250° C. So, the polymer was dissolved in dimethyl formamide to form a 5% solution, and the solution was spread on a glass plate, followed by drying for one day at 90° C. and then heating at 70° C. at reduced pressure for 10 hours. There was formed a 0.1 mm. thick film, and the properties of the film as a cation-exchange membrane were examined. The results obtained are shown in Table 1.

TABLE 1

| | Example 1 | Comparative example 1 | Comparative example 2 |
|---|---|---|---|
| Film strength (kg./cm.$^2$) (ASTM D-638-70) | 250 | 100 | 10 |
| Exchange capacity of a wet membrane (milliequivalents/gram of wet membrane) | 2.30 | 0.57 | 2.28 |
| Water content (percent) by weight | 25.2 | 13.0 | 35.0 |
| Electrical resistance (ohm cm.$^2$) | 1.6 | 119.7 | 11.2 |
| Transport number of cations in membrane | 0.96 | 0.80 | 0.89 |
| Thermal stability* | 0.995 | 0.36 | ---------- |

*The thermal stabilities of the copolymers obtained in Example 1 and Comparative Example 1 were examined by the following method:

$$\text{Thermal stability} = \frac{\text{Sulfonic acid group content after film formation (mmols/dried resin)}}{\text{Sulfonic acid group content before film formation (mmols/dried resin)}}$$

The sulfonic acid group content of the copolymer after film formation was determined by measuring the sulfur content of the sample after measuring the water content as described above by elemental analysis, and the content of sodium by atomic absorption analysis. It is clearly seen that the copolymer used in this invention has very good thermal stability, whereas the copolymer disclosed in Comparative Example 1 has poor thermal stability.

In Example 2, the thermal stability was not determined since the method of film formation was different.

Examples 2 and 3

(1) Preparation of a water-insoluble random copolymer A:

Propylene was copolymerized with undecylenic acid using titanium trichloride and diethyl aluminum chloride as a catalyst to form a propylene/undecylenic acid copolymer containing 1.13 m-mols of carboxylic acid groups per gram of the copolymer and having an intrinsic viscosity [$\eta$], as measured in decalin at 135° C., of 1.90 dl./g. When 100 g. of this copolymer was heated under reflux for 1 hour in a mixture of 100 ml. of a 10% aqueous solution of sodium hydroxide and 1 liter of methanol, the carboxylic acid groups contained in the copolymer were converted to sodium salts. 100 g. of this copolymer (sodium salt) and 21 g. of 1,3-propane sultone were placed in 1 liter of para-xylene, and reacted at 130° C. for 2 hours. The reaction product was thoroughly washed with acetone, and dried at reduced pressure to afford 109 g. of a white powdery product (sulfopropylated propylene copolymer). The copolymer was extracted with boiling methanol for 24 hours, and the extract was subjected to elemental analysis. It was found that 0.970 m-mol of sulfur was contained per gram of the sulfopropylated propylene copolymer. An atomic absorption analysis showed that 0.969 m-mol of sodium was contained per gram of the copolymer. This sulfopropylated propylene copolymer had an intrinsic viscosity $[\eta]$ of 2.1 (dl./g.), a Vicat softening point of 138° C., and a melt index of 2.1 (g./10 min.).

(2) Preparation of water-insoluble random copolymer B:

100 g. of commercially available ethylene/sodium methacrylate copolymer (Sarlin, trademark, Du Pont; ethylene content 85% by weight, degree of neutrality 20%) was dissolved in 1 liter of para-xylene by heating, and 80 ml. of a 2 N ethanolic sodium hydroxide solution was added with stirring over the course of 1 hour. Furthermore, the mixture was heated under reflux for one hour. The product was thoroughly washed with methanol, and dried at reduced pressure, when the unneutralized carboxylic acid groups contained in the copolymer were converted to sodium salts. 100 g. of this copolymer (completely neutralized) and 35 g. of 1,3-propane sultone were placed in 1 liter of para-xylene, and reacted at 130° C. for 1 hour. The product was thoroughly washed with acetone and dried at reduced pressure to afford 119 g. of a white powdery product (sulfopropylated ethylene copolymer). The copolymer was extracted with boiling methanol for 24 hours. The extract was subjected to elemental analysis, and it was found that sulfur was contained in the copolymer in an amount of 1.37 m-mols per gram of the sulfopropylated ethylene copolymer. An atomic absorption analysis showed that 1.35 m-mols of sodium was contained. This sulfopropylated ethylene copolymer had a melt index of 0.7 (g./10 min.) and a Vicat softening point of 70° C.

(3) Each of the copolymers A and B above was compression molded to form a 0.15 mm. thick film, and the properties of the film as a cation-exchange membrane were examined. The results are shown in Table 2. It was found that both of these water-insoluble random copolymers had sufficient properties for use as cation-exchange membranes.

TABLE 2

| Example | 2 | 3 |
|---|---|---|
| Water-insoluble random copolymer | A | B |
| Strength of the film (kg./cm.²) | 200 | 250 |
| Exchange capacity of wet membrane (milliequivalent/gram of the wet membrane) | 0.75 | 1.01 |
| Water content (percent by weight) | 21.2 | 20.4 |
| Electrical resistance (ohms cm.²) | 10.8 | 5.4 |
| Transport number of cations in membrane | 0.89 | 0.93 |

Examples 4 and 5

(1) Production of Fiber C:

50 g. of a modified propylene copolymer prepared in the same way as in Example 2 was placed in 500 ml. of a 1 N aqueous solution of hydrochloric acid, and allowed to stand for 24 hours. After washing with water, the product was dried at reduced pressure. An atomic absorption analysis showed that this copolymer did not contain sodium. 20 g. of the modified propylene copolymer thus treated with hydrochloric acid was placed in 1 liter of a mixed solvent consisting of 80% by weight of decalin and 20% by weight of dimethyl sulfoxide, and dissolved by heating to 140° C. When this polymer solution was poured little by little in 5 liters of acetone, porous cotton-like fibers were obtained.

(2) Production of Fiber D:

An ethylene/acrylic acid copolymer (83 mol percent of ethylene units and 17 mol percent of acrylic acid units, melt index of 30 g./10 min., and $[\eta]$ of 0.14 (dl./g.) was treated in the same way as in Example 3 to neutralize the carboxylic acid groups completely.

100 g. of this copolymer (sodium salt) and 60 g. of 1,3-propanesultone were placed in 1 liter of refined para-xylene and stirred at 130° C. for 1 hour. The product was thoroughly washed with acetone, and dried at reduced pressure to afford a modified copolymer having a melt index of 0.1 g./10 min. and a Vicat softening point of 61° C. This modified copolymer was subjected to elemental analysis, and it was found that this sulfopropylated ethylene copolymer contained 2.43 m-mols of sodium per gram of the copolymer. An atomic absorption analysis showed that it contained 2.45 m-mols of sodium per gram thereof. The modified ethylene copolymer so obtained was treated in the same way as in Example 4 with hydrochloric acid. The treated modified ethylene copolymer (20 g.) was placed in 1 liter of a mixed solvent consisting of 90% by weight of para-xylene and 20% by weight of dimethyl sulfoxide, and heated at 140° C. When the resulting polymer solution was poured little by little in acetone with stirring, porous cotton-like fibers were obtained.

(3) Each of the fibers C and D were tightly filled in a glass tube having an inside diameter of 3 cm. so that the height of the fiber layer became 20 cm., and from the bottom of the tube, a 0.01 N aqueous solution of sodium hydroxide was fed at a rate of 10 ml./sec. The drainage from the top of the tube was titrated with a 0.001 N aqueous solution of hydrochloric acid, and no sodium hydroxide was detected from it.

What we claim is:

1. A cation-exchangeable structure which consists of a water-insoluble random copolymer having
   (A) olefin units of formula (1)

wherein R' is a member selected from the group consisting of a hydrogen atom and an alkyl radical having 1 to 4 carbon atoms, and
   (B) units of formula (2)

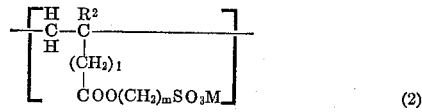

wherein R² is a member selected from the group consisting of a hydrogen atom and a methyl radical, $l$ is 0 or an integer of 5 to 8, $m$ is 3 or 4, and M is a member selected from the group consisting of a hydrogen atom and alkali metals,
the amount of the units of formula (2) being 0.1 to 5 milliequivalents per gram of the random copolymer.

2. The cation-exchangeable structure of claim 1 wherein said water-insoluble random copolymer has a Vicat softening point of 60 to 250° C.

3. The cation-exchangeable structure of claim 1 which is in the form selected from the group consisting of a filamentary structure and a membrane.

References Cited

UNITED STATES PATENTS 3,711,449    1/1971    Brendley.

FOREIGN PATENTS 1,575,782    7/1969    France.

MELVIN GOLDSTEIN, Primary Examiner

U.S. Cl. X.R.

260—79.3 M